United States Patent
Kitta

(10) Patent No.: US 8,804,806 B2
(45) Date of Patent: Aug. 12, 2014

(54) SYMBOL TIMING RECOVERY CIRCUIT

(75) Inventor: Tatsuaki Kitta, Hachiohji (JP)

(73) Assignee: Fujitsu Semiconductor Limited, Yokohama (JP)

( * ) Notice: Subject to any disclaimer, the term of this patent is extended or adjusted under 35 U.S.C. 154(b) by 219 days.

(21) Appl. No.: 13/533,673

(22) Filed: Jun. 26, 2012

(65) Prior Publication Data

US 2013/0034142 A1     Feb. 7, 2013

(30) Foreign Application Priority Data

Aug. 4, 2011     (JP) .................................. 2011-171056

(51) Int. Cl.
 *H03H 7/30* (2006.01)
 *H03H 7/40* (2006.01)
 *H03K 5/159* (2006.01)

(52) U.S. Cl.
 USPC ....................................................... 375/232

(58) Field of Classification Search
 USPC ....................................................... 375/232
 See application file for complete search history.

(56) References Cited

U.S. PATENT DOCUMENTS

| 6,563,897 | B1 | 5/2003 | Kitta |
| 6,975,676 | B1 * | 12/2005 | Goodson et al. ............... 375/231 |
| 2001/0019583 | A1 | 9/2001 | Udagawa |
| 2009/0028279 | A1 * | 1/2009 | Kitta ............................. 375/371 |

FOREIGN PATENT DOCUMENTS

| JP | 2000-101659 A | 4/2000 |
| JP | 2009-33300 A | 2/2009 |
| JP | 2001-251226 A | 7/2010 |
| JP | 2010-161640 A | 7/2010 |

* cited by examiner

*Primary Examiner* — Chieh M Fan
*Assistant Examiner* — Tanmay Shah
(74) *Attorney, Agent, or Firm* — Arent Fox LLP

(57) ABSTRACT

Disclosed is a symbol timing recovery circuit which includes an interpolator to generate, using a first filter, interpolation data of an input signal; a forward equalizer to eliminate, using a second filter, a forward interference wave from the input signal based on the interpolation data, and to output the resultant signal after the elimination, a first identification signal, and a first error signal; a backward equalizer to eliminate, using a third filter, a backward interference wave from the input signal based on the interpolation data, and to output the resultant signal after the elimination, a second identification signal, and a second error signal; and a timing recovery unit to generate a tap coefficient of the first filter, based on a tap coefficient of the second filter, a tap coefficient of the third filter, the first identification signal, the first error signal, the second identification signal, and the second error signal.

9 Claims, 12 Drawing Sheets

F I G. 3
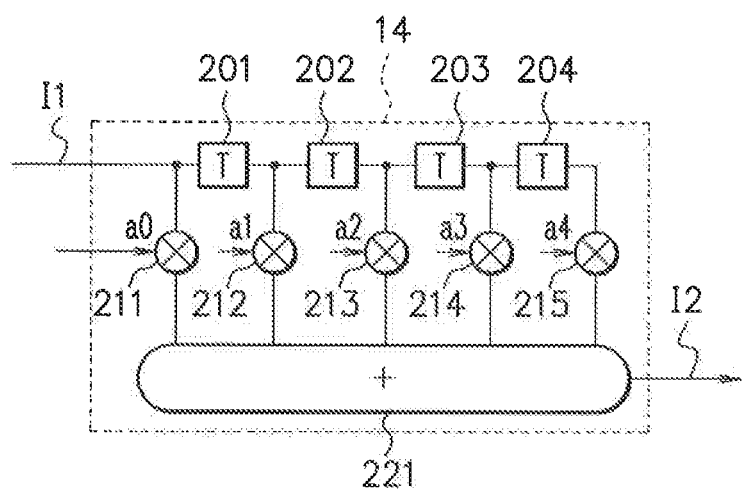

F I G. 9A
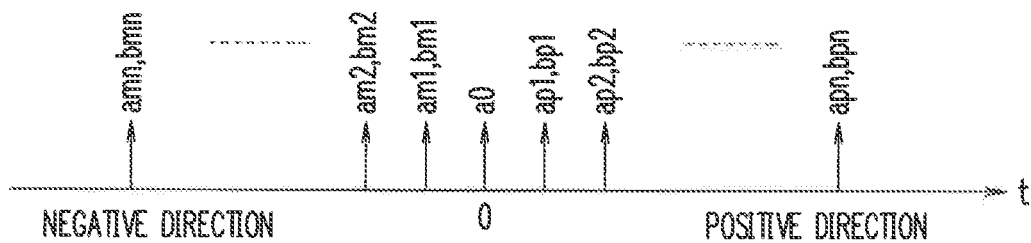
F I G. 9B
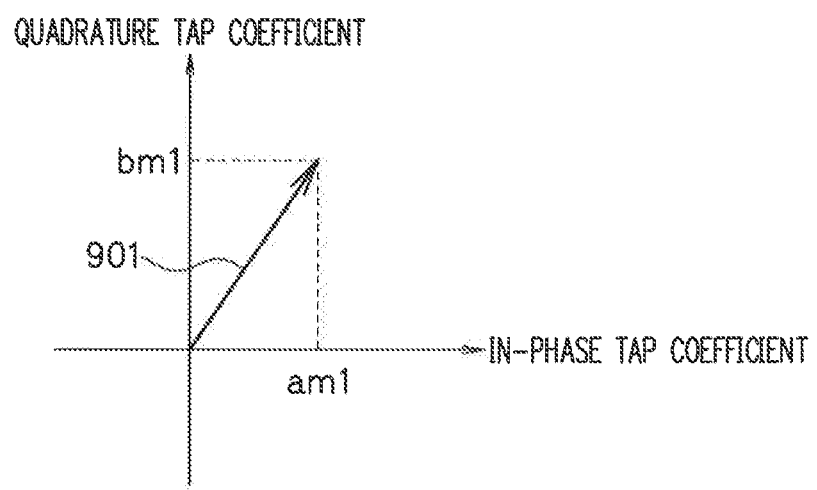

F I G. 10A
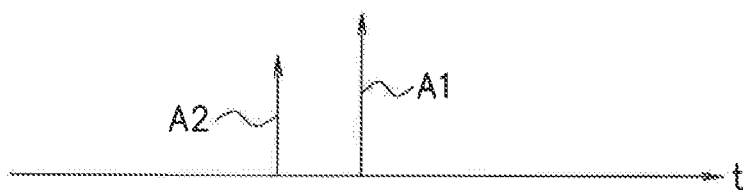
F I G. 10B
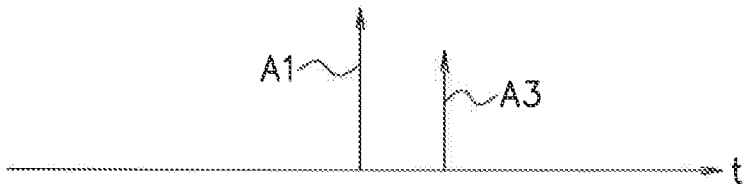

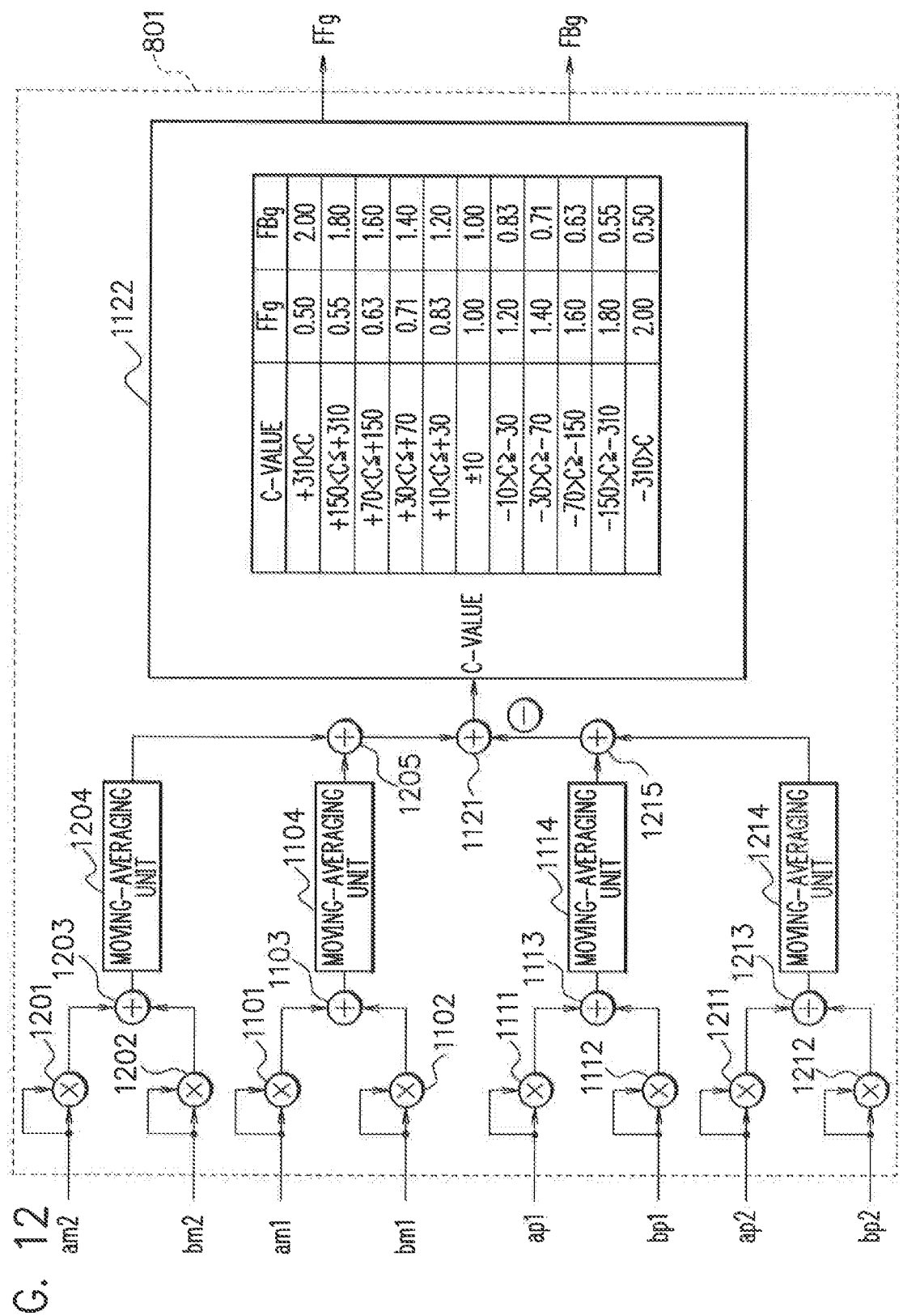

SYMBOL TIMING RECOVERY CIRCUIT

CROSS-REFERENCE TO RELATED APPLICATION

This application is based upon and claims the benefit of priority of the prior Japanese Patent Application No. 2011-171056, filed on Aug. 4, 2011, the entire contents of which are incorporated herein by reference.

FIELD

The embodiments relate to a symbol timing recovery circuit.

BACKGROUND

Receiver has a symbol timing recovery circuit for recovering symbol timing from a received signal, so as to recover the received signal. A known symbol timing recovery circuit is such as controlling phase of the received signal, and synchronizing it to clock (see Japanese Laid-Open Patent Publication Nos. 2000-101659 and 2009-33300, for example).

Also known is an equalizer having a forward equalizer and a backward equalizer, each composed of a transversal filter, which is configured to have an auxiliary equalizer and an equalizer control circuit (see Japanese Laid-Open Patent Publication No. 2010-161640, for example).

There is still also known a sort of Viterbi equalizer estimating a transmitted signal from the received signal, using an estimated channel coefficient, which is especially configured as a bidirectional Viterbi equalizer implementing forward equalization proceeded along the time axis of the received signal, and backward equalization proceeded backward along the time axis (see Japanese Laid-Open Patent Publication No. 2001-251226, for example).

SUMMARY

A symbol timing recovery circuit includes: an interpolator to generate at least one of an interpolation data of zero-crossing point and data identification point of an input digital signal, using a first finite impulse response filter; a forward equalizer to eliminate a forward interference wave from the input digital signal based on the interpolation data generated by the interpolator, using a second finite impulse response filter, and to output a first resultant signal obtained after the elimination, a first identification signal, and a first error signal; a backward equalizer to eliminate a backward interference wave of the input digital signal based on the interpolation data generated by the interpolator, using a first infinite impulse response filter, and to output a second resultant signal obtained after the elimination, a second identification signal, and a second error signal; a first tap coefficient calculating unit to calculate a tap coefficient of the second finite impulse response filter, based on the interpolation data generated by the interpolator, the first resultant signal and the second resultant signal; a second tap coefficient calculating unit to calculate a tap coefficient of the first infinite impulse response filter, based on the interpolation data generated by the interpolator, the first resultant signal and the second resultant signal; and a timing recovery unit to generate a tap coefficient of the first finite impulse response filter, based on the tap coefficient of the second finite impulse response filter, the tap coefficient of the first infinite impulse response filter, the first identification signal, the first error signal, the second identification signal and the second error signal.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention.

BRIEF DESCRIPTION OF DRAWINGS

FIG. 3 is a drawing illustrating an exemplary configuration of an interpolator illustrated in FIG. 1A;

FIG. 9A is a drawing illustrating tap coefficients of the forward equalizer and the backward equalizers and FIG. 9B is a drawing illustrating size of vector given by an in-phase tap coefficient and a quadrature tap coefficient;

FIGS. 10A and 10B are drawings for explaining operations of a control circuit illustrated in FIG. 8;

FIG. 12 is a drawing illustrating an exemplary configuration of a control circuit of another embodiment.

DESCRIPTION OF EMBODIMENTS

Figure 1:
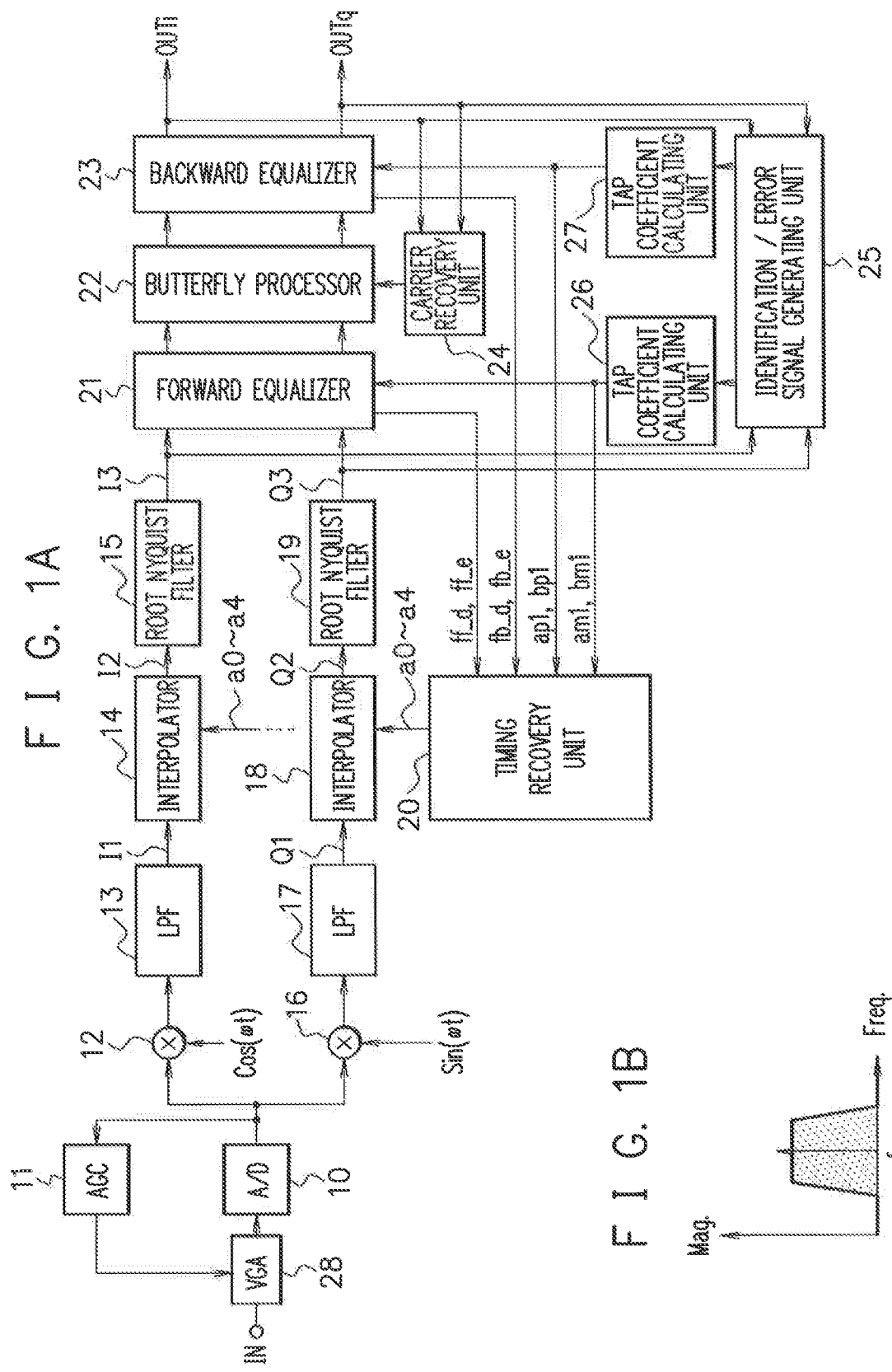
FIG. 1A is a drawing illustrating an exemplary configuration of a QAM decoder having a symbol timing recovery circuit according to one embodiment.
FIG. 1B is drawing illustrating a frequency spectrum of an intermediate frequency signal.

FIG. 1A is a drawing illustrating an exemplary configuration of a QAM (Quadrature Amplitude Modulation) decoder (receiver) having a symbol timing recovery circuit of one embodiment, and FIG. 1B is a drawing illustrating a frequency spectrum of an intermediate frequency (IF) signal IN. QAM is a mode of modulation for transmitting data by appropriately adjusting amplitude and phase of two independent carrier waves (in-phase carrier wave and quadrature carrier wave). The QA decoder is typically implemented as hardware on an LSI. The IF signal IN modulated by QAM is a bandpass transmitted signal, and has a trapezoidal spectral pattern over a certain frequency band as illustrated in FIG. 1B. A variable gain amplifier 28 amplifies the IF signal IN at a predetermined gain, and then outputs the result. An analog/digital converter 10 converts the analog output signal of the variable gain amplifier 28 into a digital signal, and outputs the result. An automatic gain controller 11 judges whether power of the output signal of the analog/digital converter 10 is larger than a desired value or not, so as to control gain of the variable gain amplifier 28. A multiplier 12 multiplies the output signal of the analog/digital converter 10 by signal Cos (ωt), and outputs an in-phase (I)-channel signal. A multiplier 16 multiplies the output signal of the analog/digital converter 10 by signal Sin (ωt), and outputs a quadrature (Q)-channel signal. In other words, the output signal of the analog/digital converter 10 is split into the I-channel signal and the Q-channel signal. The center frequency fc of the trapezoidal spectral pattern of the IF signal spectrum illustrated in FIG. 1B is adopted herein as a frequency corresponded to angular frequency ω, which is given by ω=2×π×fc. A low-pass filter 13 eliminates high frequency components of the I-channel signal of the multiplier 12, and outputs an I-channel signal I1. A low-pass filter 17 eliminates high frequency components of the Q-channel signal of the multiplier 16, and outputs a Q-channel signal Q1. An interpolator 14 has a finite impulse response (FIR) filter, interpolates the I-channel signal I1 based on tap coefficients a0 to a4 so as to output an I-channel signal I2, to thereby recover a symbol timing. An interpolator 18 has an FIR filter, interpolates the Q-channel signal Q1 based on the tap coefficients a0 to a4 so as to output a Q-channel signal Q2, to thereby recover a symbol timing.

Figure 2:
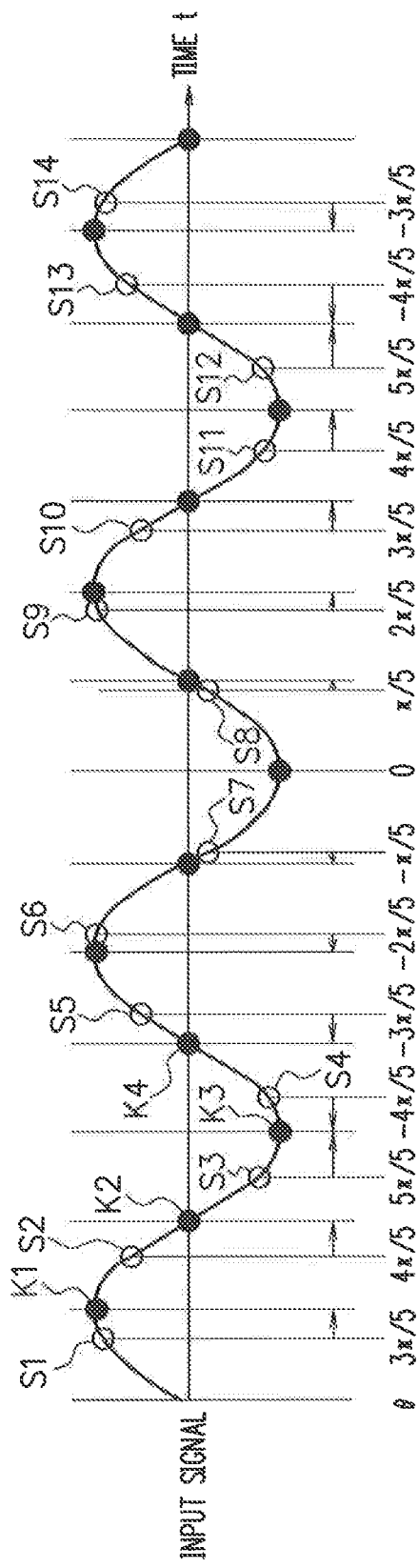
FIG. 2 is a time chart for explaining operations of the symbol timing recovery circuit.

FIG. 2 is a time chart for explaining operations of the symbol timing recovery circuit. Sampling frequency of the analog/digital converter 10 is larger than twice the frequency of symbol rate of the input signal IN. In the example illustrated in FIG. 2, sampling digital data S1 to S14 are obtained by the analog/digital converter 10. In FIG. 2, open circles denote points of sampling, and filled circles denote zero-crossing points and data identification points of the input signal IN.

FIG. 3 is a drawing illustrating an exemplary configuration of the interpolator 14 illustrated in FIG. 1A. Also the interpolator 18 illustrated in FIG. 1A has a configuration similar to that of the interpolator 14. The interpolator 14 typically has a 5-tap first FIR filter composed of four delayers (flip-flops) 201 to 204, five multipliers 211 to 215, and an adder 221. The delayer 201 delays the I-channel signal signal I1, and outputs the result. The delayer 202 delays the output signal of the delayer 201, and outputs the result. The delayer 203 delays the output signal of the delayer 202, and outputs the result. The delayer 204 delays the output signal of the delayer 203, and outputs the result. The multiplier 211 multiplies the I-channel signal I1 and the tap coefficient a0, and outputs the product. The multiplier 212 multiplies the output signal of the delayer 201 and the tap coefficient a1, and outputs the product. The multiplier 213 multiplies the output signal of the delayer 202 and the tap coefficient a2, and outputs the result. The multiplier 214 multiplies the output signal of the delayer 203 and the tap coefficient a3, and outputs the product. The multiplier 215 multiplies the output signal of the delayer 204 and the tap coefficient a4, and outputs the product. The adder 221 adds the output signals of the multipliers 211 to 215, and outputs the I-channel signal I2.

The interpolator 14, having the first FIR filter incorporated therein, performs interpolation using the sampling data S1 to S14 of the input digital signal I1, so as to generate interpolation data for the zero-crossing points K2, K4 and the data identification points K1, K3 of the input digital signal I1. Note that the interpolator 14 does not always necessarily generate the interpolation data for data identification points K1, K3 and zero-crossing points K2, K4 of the input digital signal I1 by interpolation, but may generate interpolation data for either one set of the identification points K1, K3, and the zero-crossing points K2, K4 (for example, only for a set of data identification points K1, K3).

Figure 4:
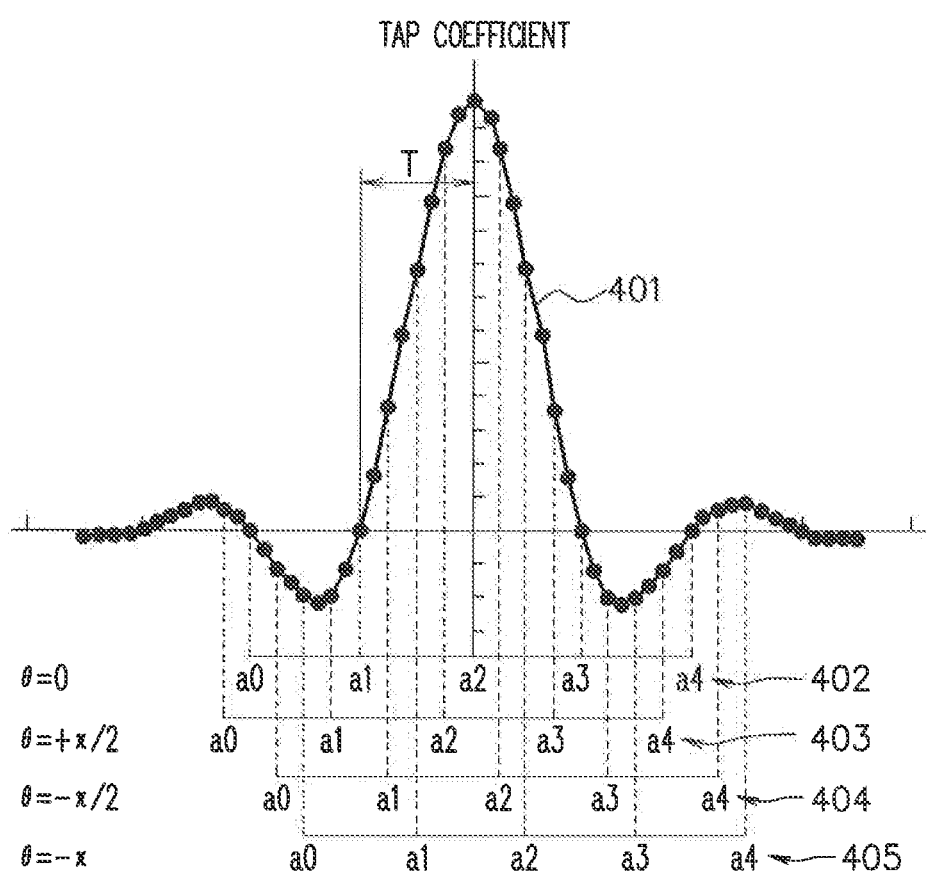
FIG. 4 is a drawing for explaining operations of the interpolator.

FIG. 4 is a drawing for explaining operations of the interpolator (FIR filter) 14. While the description below will deal with the interpolator 14, the same will apply also to the interpolator 18. A characteristic curve 401 illustrated in FIG. 4 corresponds to an impulse response of a low-pass filter having a cutoff frequency of "2×fs". The frequency fs represents frequency of symbol rate of the input signal IN. Time T corresponds to the amounts of delay of the individual delayers 201 to 204 owned by the interpolator (FIR filter) 14. Note that the time T corresponds to one period (or, 2π) of sampling frequency of the analog/digital converter 10.

The interpolator 14 adjusts the phase of the input signal I1, based on five tap coefficients a0 to a4. The tap coefficients a0 to a4 herein are determined corresponding to phase signal θ, by a tap coefficient calculating unit 704 in a timing recovery unit 20 illustrated in FIG. 8 described later. For example, if the phase signal θ is "zero" as indicated by reference numeral 402, the impulse responses other than the tap coefficient a2 will have a value of zero. The interpolator 14 herein operates as a delayer causing a delay time of 2T. If the phase signal θ is "+π/2" as indicated by reference numeral 403, five correspondent tap coefficients a0 to a4 are given, so as to cause a delay time in the interpolator 14 of "2T+T/4". Phase of the input signal I1 herein lags by "T/4 (or, π/2)" as a result of passing through the interpolator 14. On the other hand, if the phase signal θ is "−π/2" as indicated by reference numeral 404, five correspondent tap coefficients a0 to a4 are given, so as to cause a delay time in the interpolator 14 of "2T−T/4". Phase of the input signal I1 herein advances by "T/4 (or, π/2)" as a result of passing through the interpolator 14. Similarly, if the phase signal θ is "−π" as indicated by reference numeral 405, five correspondent tap coefficients a0 to a4 are given, and thereby phase of the input signal I1 advances by "π" as a result of passing through the interpolator 14. In this way, the interpolator 14 can adjust the phase of the input signal I1.

Referring now to the exemplary case illustrated in FIG. 2, where phase of the sampling data S1 lags by 3π/5 behind the data identification point K1. The interpolator 14 herein is given with the tap coefficients a0 to a4 used for advancing the phase of the input signal I1 by 3π/5. The interpolator 14 then outputs a value at the data identification point K1. Phase of the sampling data S2 lags by 4π/5 behind the zero-crossing point K2. The interpolator 14 herein is given with the tap coefficients a0 to a4 used for advancing the phase of the input signal I1 by 4π/5. The interpolator 14 then outputs a value at the zero-crossing point K2. Phase of the sampling data S3 lags by π behind the data identification point K3. The interpolator 14 herein is given with the tap coefficients a0 to a4 used for advancing the phase of the input signal I1 by π. The interpolator 14 then outputs a value at the data identification point K3. By performing the interpolation using the sampling data as described in the above, the interpolator 14 outputs the values at the data identification points K1, K3 and the zero-crossing points K2, K4 of the input signal I1.

Referring now to FIG. 1A, a route Nyquist filter 15 filters the output signal I2 of the interpolator 14, and outputs an I-channel signal I3. A route Nyquist filter 19 filters the output signal Q2 of the interpolator 18, and outputs a Q--channel signal Q3. The route Nyquist filters 15 and 19 are also provided to a transmitter, so as to effect band limitation as a result of Nyguist filtering by the contribution of the transmitter and the receiver.

In a multipath environment, as illustrated in FIGS. 10A and 10B, a signal transmitted from the transmitter may be reflected or diffracted by obstacles, so that the receiver may receive, through a plurality of paths, a main wave (desired wave) A1, an forward interference wave (preceding wave) A2 and/or a backward interference wave (delay wave) A3 having different amounts of delay, although they were originated from the same signal. The main wave A1 is a signal wave obtained through a path with a largest electric power. The forward interference wave A2 is an interference wave on a path causing a predetermined amount of delay ahead of the main wave A1. The backward interference wave A3 is an interference wave on a path causing a predetermined amount of delay behind the main wave A1.

The forward equalizer 21 is configured by a complex FIR filter, and outputs, when the forward interference wave A2 resides ahead of the main wave A1 as illustrated in FIG. 10A, the signal wave after eliminating the forward interference wave A2. The forward equalizer 21 eliminates the forward interference wave A2 mainly in the non-minimum phase (in the pre-ghost state). A butterfly processor 22 receives the output signal of the forward equalizer 21, corrects an error in the carrier frequency, and recovers the carrier. A carrier recovery unit 24 detects the amount of shifting of the carrier frequency based on rotation of constellation caused by a decoded I-channel signal OUTi and a Q-channel signal OUTq, and controls the butterfly processor 22 in the direction capable of terminating the rotation of constellation. A backward equalizer 23 is configured by a complex IIR (infinite impulse response) filter, and outputs, when the backward interference wave A3 resides behind the main wave A1 as illustrated in FIG. 10B, the decoded I-channel signal OUTi and the Q-channel signal OUTq after eliminating the backward interference wave A3. The backward equalizer 23 eliminates the backward interference wave A3, mainly in the minimum phase (in the post-ghost state). An identification/error signal generating unit 25 generates an identification signal and an error signal, based on the input signals I3, Q3 towards the forward equalizer 21 and the output signals OUTi, OUTq of the backward equalizer 23, and outputs them to tap coefficient calculating units 26 and 27. The first tap coefficient calculating unit 26 aimed at eliminating the forward interference wave A2 generates a tap coefficient based on the identification signal and the error signal, and outputs it to the forward equalizer 21. The forward equalizer 21 eliminates the forward interference wave A2 based on the tap coefficient, using the complex FIR filter. The second tap coefficient calculating unit 27 aimed at eliminating the backward interference wave A3 generates a tap coefficient based on the identification signal and the error signal, and outputs it to the backward equalizer 23. The backward equalizer 23 eliminates the backward interference wave A3, based on the tap coefficient, using the complex IIR filter.

The timing recovery unit 20 receives a first identification signal ff_d and a first error signal ff_e from the forward equalizer 21, a second identification signal fb_d and a second error signal fb_e from the backward equalizer 23, a first in-phase tap coefficient am1 and a first quadrature tap coefficient bm1 from the first tap coefficient calculating unit 26, a first in-phase tap coefficient ap1 and a first quadrature tap coefficient bp1 from the second tap coefficient calculating unit 27, and outputs the same tap coefficients a0 to a4 to the interpolators 14 and 18.

Figure 5:
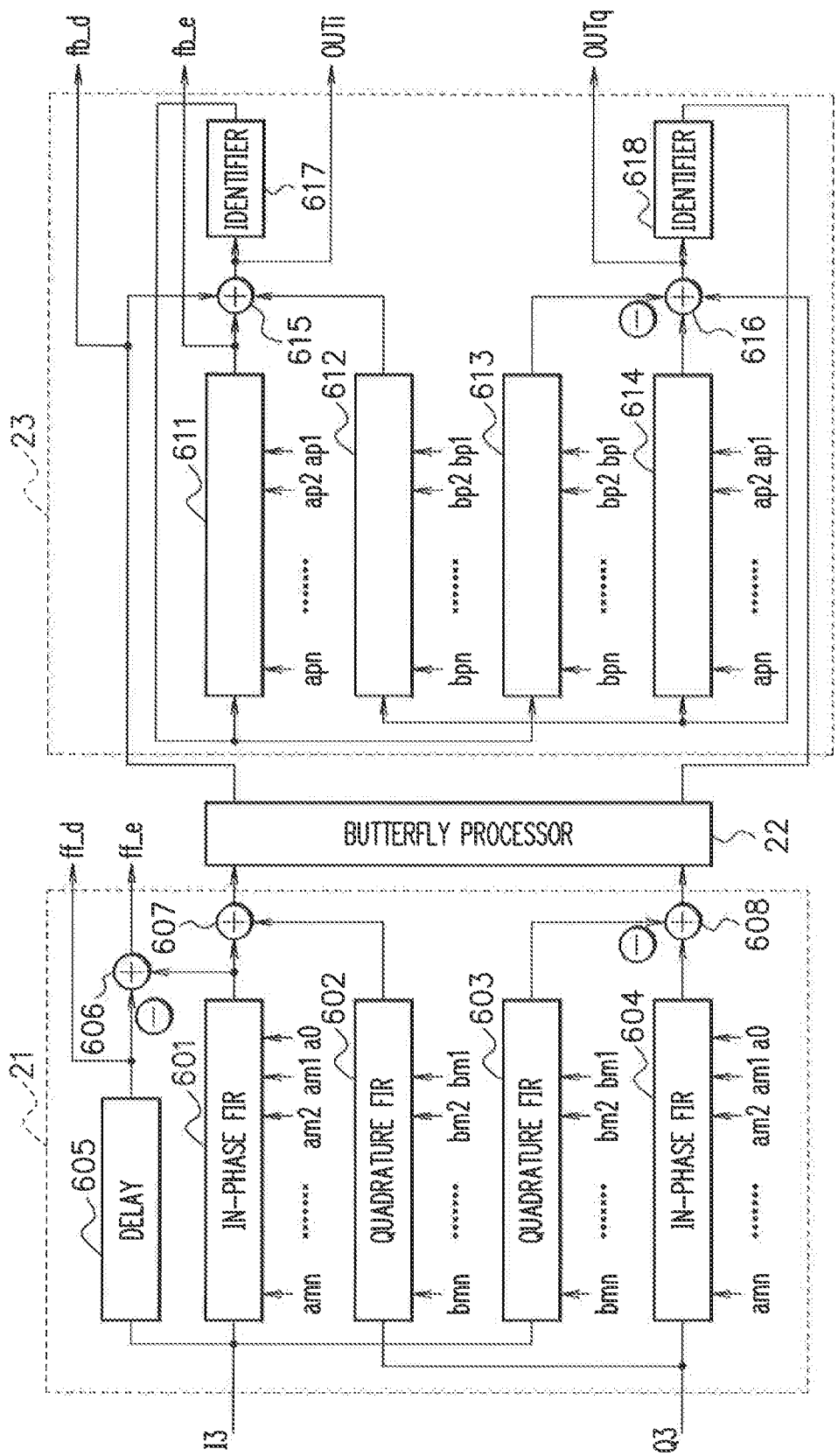
FIG. 5 is a drawing illustrating an exemplary configuration of a forward equalizer and a backward equalizer illustrated in FIG. 1A.

FIG. 5 is a drawing illustrating an exemplary configuration of the forward equalizer 21 and the backward equalizer 23 illustrated in FIG. 1A. The forward equalizer 21 is configured by a complex FIR filter having a delayer 605, in-phase FIR filters 601, 604, quadrature FIR filters 602, 603, subtractors 606, 608 and an adder 607. The delayer 605 lags the I-channel signal I3 by the amount of delay same as that caused by the in-phase FIR filter 601, and outputs the first identification signal ff_d.

The in-phase FIR filter 601 is configured similarly to the interpolator (FIR filter) 14 illustrated in FIG. 3, filters the real part of the I-channel signal I3 based on the in-phase tap coefficients a0, am1 to amn received from the first tap coefficient calculating unit 26, and outputs a corrected in-phase component signal. The quadrature FIR filter 603 is configured similarly to the interpolator (FIR filter) 14 illustrated in FIG. 3, filters the imaginary part of the I-channel signal I3 based on the quadrature tap coefficients bm1 to bmn received from the first tap coefficient calculating unit 26, and outputs a corrected quadrature component signal.

The in-phase FIR filter 604 is configured similarly to the interpolator (FIR filter) 14 illustrated in FIG. 3, filters the real part of the Q-channel signal Q3 based on the in-phase tap coefficients a0, am1 to amn received from the first tap coefficient calculating unit 26, and outputs a corrected in-phase component signal. The quadrature FIR filter 602 is configured similarly to the interpolator (FIR filter) 14 illustrated in FIG. 3, filters the imaginary part of the Q-channel signal Q3 based on the quadrature tap coefficients bm1 to bmn received from the first tap coefficient calculating unit 26, and outputs a corrected quadrature component signal.

The adder 607 adds the corrected in-phase component signal output by the in-phase FIR filter 601 and the corrected quadrature component signal output by the quadrature FIR filter 602, and outputs the I-channel signal from which the forward interference wave A2 has been eliminated. The subtractor 608 subtracts the corrected quadrature component signal output by the quadrature FIR filter 603, from the corrected in-phase component signal output by the in-phase FIR filter 604, and outputs the Q-channel signal from which the forward interference wave A2 has been eliminated. The subtractor 606 subtracts the first identification signal ff_d from the corrected in-phase component signal output by the in-phase FIR filter 601, and outputs the first error signal (in-phase component) ff_e. The first error signal ff_e represents error information in the direction of time axis.

The butterfly processor 22 receives the I-channel signal output by the adder 607 and the Q-channel signal output by the subtractor 608, performs butterfly calculation, corrects an error in the carrier frequency so as to terminate the rotation of constellation, and outputs the I-channel signal and the Q-channel signal.

The backward equalizer 23 is configured by a complex IIR filter having in-phase IIR filter calculating units 611, 614, quadrature IIR filter calculating units 612, 613, an adder 615, a subtractor 616 and identifiers 617, 618.

The in-phase IIR filter calculating unit 611 has a hardware configuration similar to that of the interpolator (FIR filter) 14 illustrated in FIG. 3, filters the real part of the I-channel signal output by the identifier 617, based on the in-phase tap coefficients ap1 to apn received from the second tap coefficient calculating unit 27, and outputs a second error signal (in-phase component) fb_e. The second error signal fb_e represents error information in the direction of time axis. The second identification signal fb_d is same as the I-channel signal output by the butterfly processor 22. The quadrature IIR filter calculating unit 613 has a hardware configuration similar to that of the interpolator (FIR filter) 14 illustrated in FIG. 3, filters the imaginary part of the I-channel signal output by the identifier 617, based on the quadrature tap coefficients bp1 to bpn received from the second tap coefficient calculating unit 27, and outputs an error signal of the quadrature component.

The in-phase IIR filter calculating unit 614 has a hardware configuration similar to that of the interpolator (FIR filter) 14 illustrated in FIG. 3, filters the real part of the Q-channel signal output by the identifier 618, based on the in-phase tap coefficients ap1 to apn received from the second tap coefficient calculating unit 27, and outputs an error signal of the in-phase component. The quadrature IIR filter calculating unit 612 has a hardware configuration similar to that of the interpolator (FIR filter) 14 illustrated in FIG. 3, filters the imaginary part of the Q-channel signal, output by the identifier 618, based on the quadrature tap coefficients bp1 to bpn received from the second tap coefficient calculating unit 27, and outputs an error signal of the quadrature component.

The adder 615 adds the I-channel signal output by the butterfly processor 22, the second error signal fb_e, and the quadrature component output by the quadrature IIR filter calculating unit 612, and outputs an I-channel signal OUTi from which the backward interference wave A3 has been eliminated. The I-channel signal OUTi is an I-channel signal of the main wave A1 from which the forward interference wave A2 and the backward interference wave A3 have been eliminated. The identifier 617 identifies the output signal OUTi of the adder 615, and outputs the identified I-channel signal.

The subtractor 616 adds the Q-channel signal output by the butterfly processor 22, and the in-phase component output by the in-phase IIR filter calculating unit 614, subtracts the quadrature component output by the quadrature IIR filter calculating unit 613 from the summed signal, and outputs a Q-channel signal OUTq from which the backward interference wave A3 has been eliminated. The Q-channel signal OUTq is a Q-channel signal of the main wave A1 from which the forward interference wave A2 and the backward interference wave A3 have been eliminated. The identifier 618 identifies the output signal OUTq of the main wave A1, and outputs the identified Q-channel signal.

While the description in the above dealt with the case where the forward equalizer 21 was provided in the preceding stage and the backward equalizer 23 was provided in the succeeding stage, the backward equalizer 23 may alternatively be provided in the preceding stage and the forward equalizer 21 may alternatively be provided in the succeeding stage.

As described in the above, the forward equalizer 21 eliminates the forward interference wave A2 from the input digital signal, using the second FIR filters 601 to 604 based on the interpolation data generated by the interpolators 14, 18, and outputs the resultant signals obtained after the elimination, the first identification signal ff_d, and the first error signal ff_e. The first identification signal ff_d is a signal before being eliminated with the forward interference wave A2. The first error signal ff_e is a differential signal between a signal before being eliminated with the forward interference wave A2 and a signal after eliminated with the forward interference wave A2. The first tap coefficient calculating unit 26 (FIG. 1A) calculates the tap coefficients a0, am1 to amn, bm1 to bmn of the second FIR filters 601 to 604, based on the interpolation data I3, Q3 generated by the interpolators 14, 18, and signals OUTi, OUTq from which the forward interference wave A2 and the backward interference wave A3 have been eliminated by the forward equalizer 21 and backward equalizer 23.

The backward equalizer 23 eliminates the backward interference wave A3 from the input digital signal using the IIR filter calculating units 611 to 614, based on the interpolation data generated by the interpolators 14, 18, and outputs the resultant signals obtained after the elimination, the second identification signal fb_d, and the second error signal fb_e. The second identification signal fb_d is a signal before being eliminated with the backward interference wave A3. The second error signal fb_e is a differential signal between a signal before being eliminated with the backward interference wave A3 and a signal after eliminated with the backward interference wave A3. The second tap coefficient calculating unit 27 (FIG. 1A) calculates the tap coefficients ap1 to apn, bp1 to bpn of the IIR filter calculating units 611 to 614, based on the interpolation data I3, Q3 generated by the interpolators 14, 18, and signals OUTi, OUTq from which the forward interference wave A2 and the backward interference wave A3 have been eliminated by the forward equalizer 21 and the backward equalizer 23.

Figure 6:
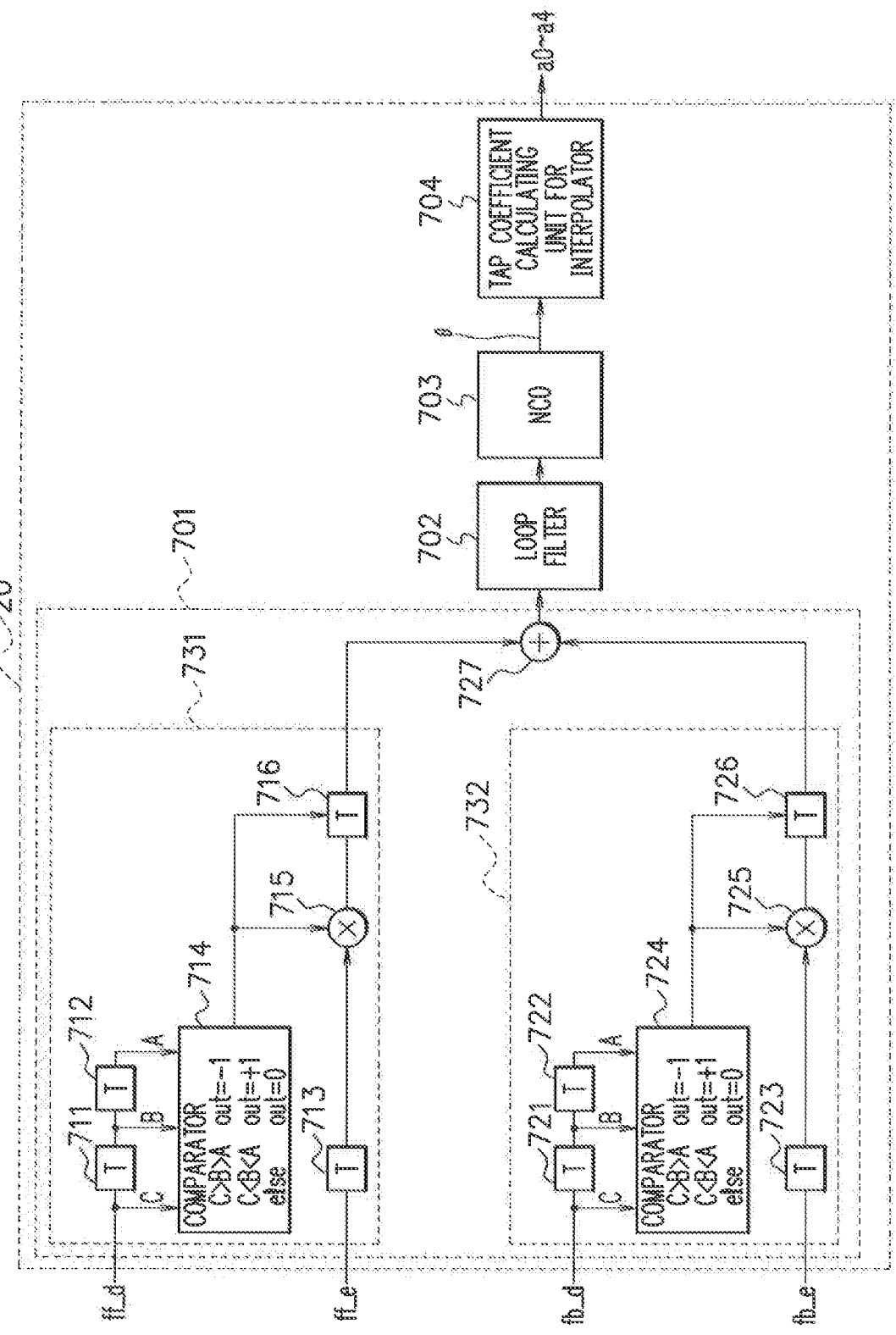
FIG. 6 is a drawing illustrating an exemplary configuration of a timing recovery unit illustrated in FIG. 1A.

FIG. 6 is a drawing illustrating an exemplary configuration of the timing recovery unit 20 (FIG. 1A) which generates the tap coefficients a0 to a4 to be fed to the interpolators 14, 18, by using only the first identification signal ff_d, the first error signal ff_e, the second identification signal fb_d and the second error signal fb_e. The first identification signal ff_d and the first error signal ff_e are signals received from the forward equalizer 21 illustrated in FIG. 5. The second identification signal fb_d and the second error signal fb_e are signals received from the backward equalizer 23 illustrated in FIG. 5. A timing recovery unit 20 has a phase comparator unit 701, a loop filter 702, a numerically controlled oscillator (NCO) 703, and a third tap coefficient calculating unit 704. The numerically controlled oscillator 703 outputs the phase signal θ. The third tap coefficient calculating unit 704 calculates the tap coefficients a0 to a4 based on the phase signal θ. The phase comparator unit 701 has a first phase comparator unit 731, a second phase comparator unit 732, and an adder 727. The first phase comparator unit 731 has delayers 711 to 713, a comparator 714, a multiplier 715, and a flip-flop 716. The second phase comparator unit 732 has delayers 721 to 723, comparator 724, a multiplier 725, and a flip-flop 726.

Figure 7A:
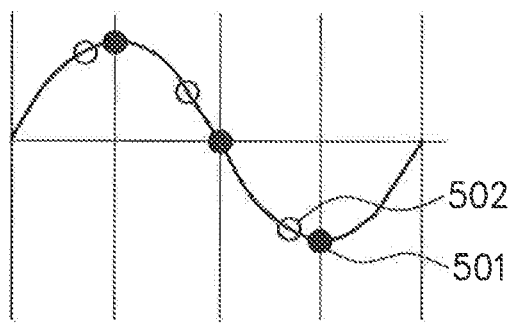
FIGS. 7A to 7D are drawings for explaining operations of a first phase comparator unit.
Figure 7B:
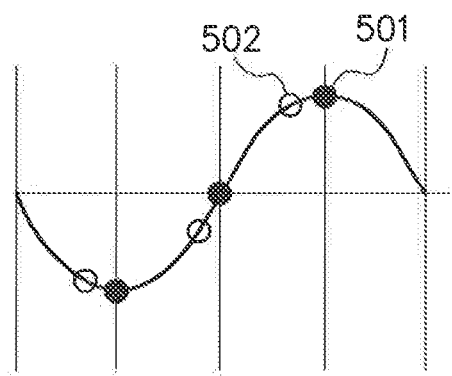
Figure 7C:
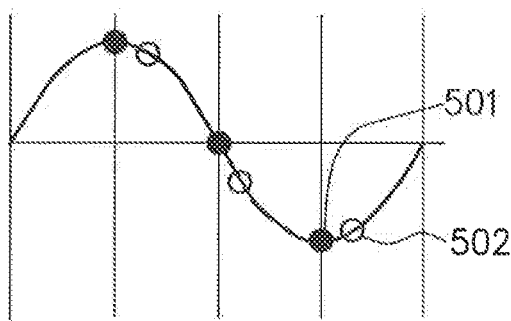
Figure 7D:
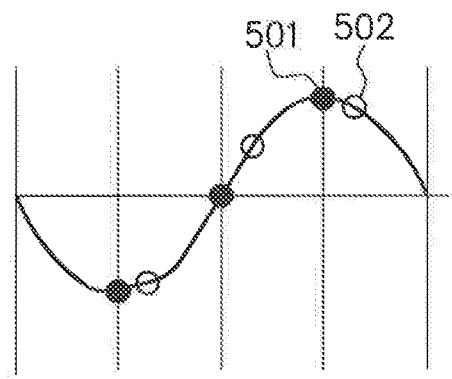

FIGS. 7A to 7D are drawings for explaining operations of the first phase comparator unit 731. FIGS. 7A and 7B illustrate the case where the input data 502 advances ahead of the ideal sampling point 501, wherein FIG. 7A represents monotonous decrease of the input data 502 and FIG. 7B represents monotonous increase of the input data 502. FIGS. 7C and 7D illustrate the case where the input data 502 lags behind the ideal sampling point 501, wherein FIG. 7C represents monotonous decrease of the input data 502, and FIG. 7D represents monotonous increase of the input data 502. The input data 502 corresponds to the first identification signal ff_d.

The first phase comparator unit 731 detects a phase error in the first identification signal ff_d. The delayer 711 delays data C of the first identification signal ff_d, and outputs data B. The delayer 712 delays the output data B of the delayer 711, and outputs data A. Assuming now the data B as a current data, the data C is understood as a future data, and the data A as a past data.

The comparator 714 compares values of the data A, B and C, and outputs "−1" if C>B>A or a monotonous increase was found, outputs "+1" if C<B<A or a monotonous decrease was found, and outputs "0" for the residual cases.

The delayer 713 delays the first error signal ff_e for adjusting timing, and output the result. In this way, the output data of the comparator 714 and the output data of the delayer 713 are adjusted to the same time. The multiplier 715 multiplies the output data of the comparator 714 and the output data of the delayer 713. The flip-flop 716 latches and outputs the output data of the multiplier 715 if the output data of the comparator 714 is "−1" or "+1", and outputs the currently-held data same as the previous data if the output data of the comparator 714 is "0". The first phase comparator unit 731 marks the first error signal ff_e with a plus/minus sign, corresponding to time-dependent transient of the first identification signal ff_d.

As described in the above, if the phase of the input data 502 advances ahead of the ideal sampling point 501, the first phase comparator unit 731 outputs a positive value as the phase error. On the other hand, if the phase of the input data 502 lags behind the ideal sampling point 501, the first phase comparator unit 731 outputs a negative value as the phase error.

Next, the second phase comparator unit 732 will be explained. The second phase comparator unit 732 receives the second identification signal fb_d and the second error signal fb_e similarly to the first phase comparator unit 731, and outputs a phase error. The delayer 721 delays data C of the second identification signal fb_d, and outputs data B. The delayer 722 delays the output data B of the delayer 721, and output data A. Assuming now the data B as a current data, the data C may be understood as a future data, and the data A may be understood as a past data. The comparator 724 compares the data A, B and C, and outputs "−1" if C>B>A or a monotonous increase was found, outputs "+1" if C<B<A or a monotonous decrease was found, and outputs "0" for the residual cases. The delayer 723 delays the second error signal fb_e for adjusting timing, and outputs the result. In this way, the output data of the comparator 724 and the output data of the delayer 723 are adjusted to the same time. The multiplier 725 multiplies the output data of the comparator 724 and the output data of the delayer 723. The flip-flop 726 latches and outputs the output data of the multiplier 725 if the output data of the comparator 724 is "−1" or "+1", and outputs the currently-held data same as the previous data if the output data of the comparator 724 is "0". The second phase comparator unit 732 marks the second error signal fb_e with a plus/minus sign, corresponding to time-dependent transient of the second identification signal fb_d.

The adder 727 adds the phase error data output by the flip-flops 716 and 726, and outputs the result.

The loop filter 702 smoothens (or averages) the phase error data output from the adder 727. In other words, the loop filter 702 operates as a low-pass filter. The phase error data smoothened by the loop filter 702 converges to an almost constant value.

The NCO 703 is an infinite-phase integrator (or complete integrator), and cumulatively adds the phase error data given by the loop filter 702. In other words, the phase error data is integrated. Since the phase error data herein is almost constant in principle, so that the phase signal θ output by the NCO 703 increases almost linearly with time. The phase error data represents a phase error per one symbol. NCO 703 has one set of reference values set thereon. The one set of reference values are defined so as to represent "+π" and "−π" when converted to phase of the input signals. The phase signal θ obtained by the NCO 703 is reset if it exceeds the other reference value ("+π", for example). The resetting herein means a process of adding "2π" to the phase signal θ (or subtracting "2π" from the phase signal θ). Accordingly, waveform of the phase signal generated by the NCO 703 will have a sawtooth profile.

The third tap coefficient calculating unit 704 generates the tap coefficients a0 to a4 based on the phase signal θ generated by the NCO 703, and outputs the same tap coefficients a0 to a4 to the interpolators 14 and 18 illustrated in FIG. 1A.

Assuming now that the forward interference wave A2 or backward interference wave A3 having a large electric power resides in the vicinity of the main wave A1, the timing recovery unit 20 illustrated in FIG. 6 may receive the first error signal ff_e or the second error signal fb_e, having a degraded confidence, from the forward equalizer 21 or the backward equalizer 23. The timing recovery unit 20 may therefore be degraded in the accuracy, and may fail in enhancing the interference wave immunity as a consequence. The paragraphs below will explain an embodiment of the timing recovery unit 20 capable of preventing the accuracy thereof from being degraded, and of improving the interference wave immunity, even if the forward interference wave A2 or the backward interference wave A3, having a large strength, resides in the vicinity of the main wave A1.

Figure 8:
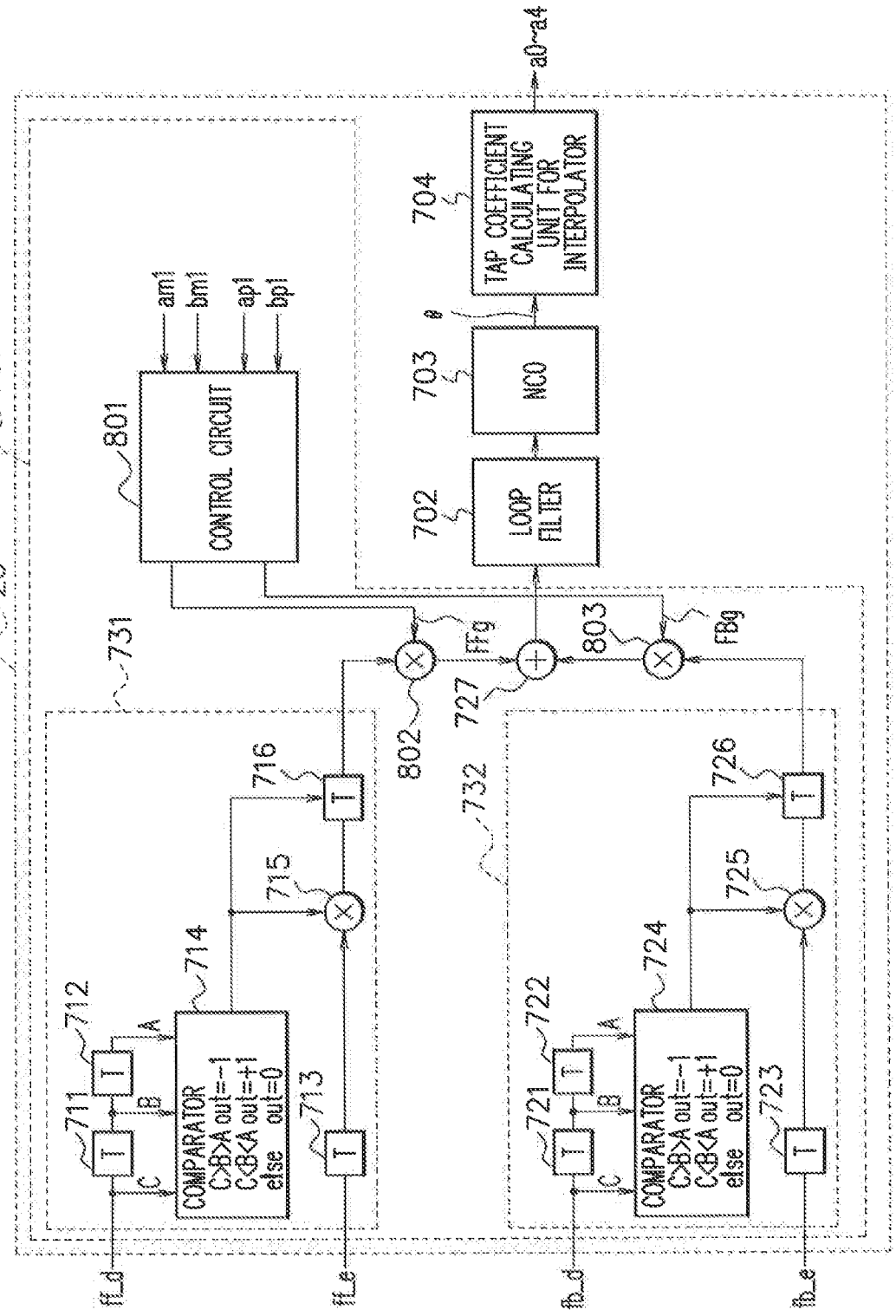
FIG. 8 is a drawing illustrating an exemplary configuration of a timing recovery unit of this embodiment.

FIG. 8 is a drawing illustrating an exemplary configuration of the timing recovery unit 20 (FIG. 1A) of this embodiment. The timing recovery unit 20 receives the tap coefficients am1, bm1 of the forward equalizer 21, the tap coefficients ap1, bp1 of the backward equalizer 23, the first identification signal ff_d, the first error signal ff_e, the second identification signal fb_d, and the second error signal fb_e, and outputs the tap coefficients a0 to a4. The timing recovery unit 20 illustrated in FIG. 8 has a control circuit 801, a first multiplier 802, and a second multiplier 803, which are provided additionally to the timing recovery unit 20 illustrated in FIG. 6. Aspects of the timing recovery unit 20 illustrated in FIG. 8, different from those of the timing recovery unit 20 illustrated in FIG. 6, will be explained in the next.

The control circuit 801, the first multiplier 802, and the second multiplier 803 are provided in the phase comparator unit 701. The first multiplier 802 is provided between the flip-flop 716 and the adder 727. The second multiplier 803 is provided between the flip-flop 726 and the adder 727. The control circuit 801 generates first gain FFg and second gain FBg, based on the tap coefficients am1, bm1 of the forward equalizer 21 and the tap coefficients ap1, bp1 of the backward equalizer 23. The first multiplier 802 multiplies the output data of the flip-flop 716 by the first gain FFg, and outputs the result. The second multiplier 803 multiplies the output data of the flip-flop 726 by the second gain FBg, and outputs the result. The adder 727 adds the output data of the first multiplier 802 and the second multiplier 803, and outputs the result. The loop filter 702 smoothens the output data of the adder 727, and outputs the result. The NCO 703 receives the output data of the loop filter 702, and outputs the phase signal θ. The third tap coefficient calculating unit 704 calculates the tap coefficients a0 to a4 based on the phase signal θ, and outputs the tap coefficients a0 to a4 same as those of the interpolators 14 and 18 illustrated in FIG. 1A.

FIG. 9A is a drawing illustrating the tap coefficients of the forward equalizer 21 and the tap coefficients of the backward equalizer 23. The tap coefficients a0, am1 to amn are tap coefficients of the in-phase FIR filters 601, 604 in the forward equalizer 21, as previously illustrated in FIG. 5. The tap coefficient a0 is a tap coefficient of the center tap corresponded to the main wave A1. The tap coefficients am1 to amn are in-phase tap coefficients corresponded to the forward interference wave A2. The tap coefficients bm1 to bmn are tap coefficients of the quadrature FIR filters 602, 603 in the forward equalizer 21, and quadrature tap coefficients corresponded to the forward interference wave A2.

The tap coefficients ap1 to apn are tap coefficients of the in-phase IIR filter calculating units 611, 614 in the backward equalizer 23, and are in-phase tap coefficients corresponded to the backward interference wave A3. The tap coefficients bp1 to bpn are tap coefficients of the quadrature IIR filter calculating units 612, 613 in the backward equalizer 23, and quadrature tap coefficients corresponded to the backward interference wave A3.

The in-phase tap coefficients am1 to amn and the quadrature tap coefficients bm1 to bmn are tap coefficients positioned, on the time scale, ahead (past) of the tap coefficient a0 of the center tap. The first in-phase tap coefficient am1 is an in-phase tap coefficient closest to the center tap (tap coefficient a0). The first quadrature tap coefficient bm1 is a quadrature tap coefficient closest to the center tap (tap coefficient a0). The second in-phase tap coefficient am2 is an in-phase tap coefficient second closest to the center tap (tap coefficient a0). The second quadrature tap coefficient bm2 is a quadrature tap coefficient second closest to the center tap (tap coefficient a0).

In contrast, the in-phase tap coefficients ap1 to apn and the quadrature tap coefficient bp1 to bpn are tap coefficients positioned behind (future) the tap coefficient a0 of the center tap. The first in-phase tap coefficient ap1 is an in-phase tap coefficient closest to the center tap (tap coefficient a0). The first quadrature tap coefficient bp1 is a quadrature tap coefficient closest to the center tap (tap coefficient a0). The second in-phase tap coefficient ap2 is an in-phase tap coefficient second closest to the center tap (tap coefficient a0). The second quadrature tap coefficient bp2 is a quadrature tap coefficient second closest to the center tap (tap coefficient a0).

FIG. 9B is a drawing illustrating size of vector 901 given by the in-phase tap coefficient am1 and the quadrature tap coefficient bm1 vector 901. On a phase plane, the size of vector 901 is expressed as $\sqrt{(am1^2+bm1^2)}$.

FIGS. 10A and 10B are drawings for explaining operations of the control circuit 801 illustrated in FIG. 8. FIG. 10A is a drawing for the case where the forward interference wave A2 resides in the vicinity of the main wave A1. The size of vector given by the first in-phase tap coefficient am1 and the first quadrature tap coefficient bm1 is expressed by $\sqrt{(am1^2+bm1^2)}$, and corresponds to strength of the forward interference wave A2 of the tap closest to the main wave A1. In contrast, the size of vector given by the first in-phase tap coefficient ap1 and the first quadrature tap coefficient bp1 is expressed by $\sqrt{(ap1^2+bp1^2)}$, and corresponds to strength of the backward interference wave A3 of the tap closest to the main wave A1. If $\sqrt{(am1^2+bm1^2)}$ is larger than $\sqrt{(ap1^2+bp1^2)}$ to a certain degree, this means that only the forward interference wave A2 resides in the vicinity of the main wave A1, or that the forward interference wave A2 is larger than the backward interference wave A3 in the vicinity of the main wave A1. In this case, the confidence of the first error signal ff_e of the forward equalizer 21 becomes inferior to that of the second error signal fb_e of the backward equalizer 23. The control circuit 801 therefore reduces the first gain FFg and increases the second gain FBg. In this way, the timing recovery unit 20 may precisely calculate the tap coefficients a0 to a4, even if the strong forward interference wave A2 resides in the vicinity of the main wave A1.

FIG. 10B is a drawing illustrating the case where the backward interference wave A3 resides in the vicinity of the main wave A1. If $\sqrt{(ap1^2+bp1^2)}$ is larger than $\sqrt{(am1^2+bm1^2)}$ to a certain degree, this means that the only backward interference wave A3 resides in the vicinity of the main wave A1, or that the backward interference wave A3 is larger than the forward interference wave A2 in the vicinity of the main wave A1. In this case, the confidence of the second error signal fb_e of the backward equalizer 23 becomes inferior to that of the first error signal ff_e of the forward equalizer 21. The control circuit 801 therefore increases the first gain FFg, and reduces the second gain FBg. In this way, the timing recovery unit 20 may precisely calculate the tap coefficients a0 to a4, even if the strong backward interference wave A3 resides in the vicinity of the main wave A1.

For the case where $\sqrt{(am1^2+bm1^2)}$ and $\sqrt{(ap1^2+bp1^2)}$ are nearly equal, this means that neither the forward interference wave A2 nor the backward interference wave A3 resides in the vicinity of the main wave A1, or that the forward interference wave A2 and the backward interference wave A3 have nearly equal strength in the vicinity of the main wave A1. In this case, the confidence of the first error signal ff_e of the forward equalizer 21 and the second error signal fb_e of the backward equalizer 23 are nearly equal. The control circuit 801 therefore adjusts the first gain FFg and the second gain FBg to a nearly equal level. In this way, the timing recovery unit 20 may precisely calculate the tap coefficients a0 to a4.

Figure 11:
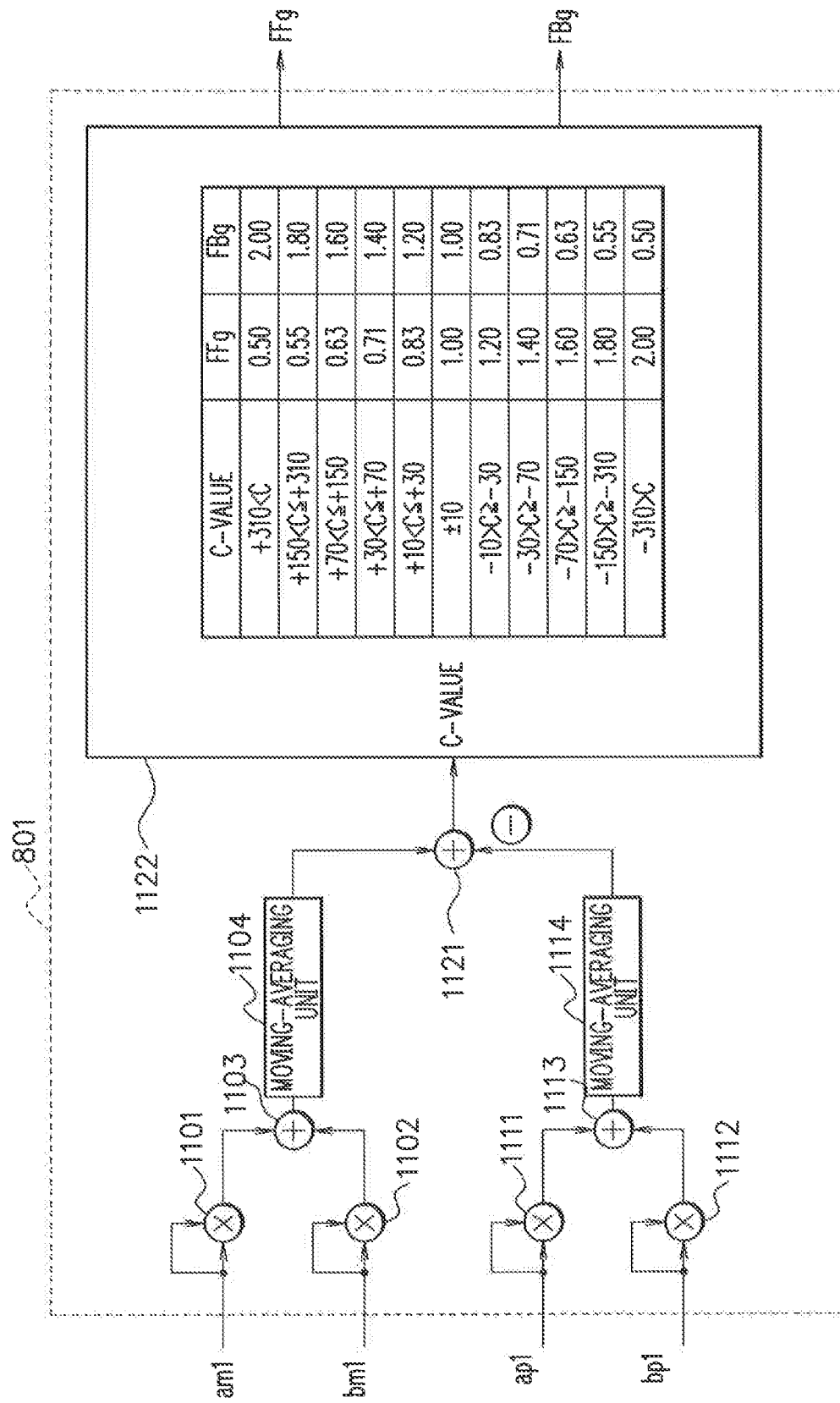
FIG. 11 is a drawing illustrating an exemplary configuration of a control circuit of this embodiment.

FIG. 11 is a drawing illustrating an exemplary configuration of the control circuit 801 (FIG. 8) of this embodiment. A multiplier 1101 outputs a squared value $am1^2$ of the first in-phase tap coefficient am1 of the forward equalizer 21. The multiplier 1102 outputs a squared value $bm1^2$ of the first quadrature tap coefficient bm1 of the forward equalizer 21. The adder 1103 adds the output values of the multipliers 1101 and 1102, and outputs the result $am1^2+bm1^2$. The value $am1^2+bm1^2$ corresponds to the size of vector $\sqrt{(am1^2+bm1^2)}$ illustrated in FIGS. 10A and 10B. A moving-averaging unit 104 performs moving-averaging (smoothing) of output value of the adder 1103, and outputs the result.

The multiplier 1111 outputs a squared value $ap1^2$ of the first in-phase tap coefficient ap1 of the backward equalizer 23. The multiplier 1112 outputs a squared value $bp1^2$ of the first quadrature tap coefficient bp1 of the backward equalizer 23. The adder 1113 adds the output values of the multipliers 1111 and 1112, and outputs the resultant value $ap1^2+bp1^2$. The value $ap1^2+bp1^2$ corresponds to the size of vector $\sqrt{(ap1^2+bp1^2)}$ illustrated in FIGS. 10A and 10B. The moving-averaging unit 1114 performs moving-averaqing (smoothing) of output value of the adder 1113, and outputs the result. The subtractor 1121 subtracts the output value of the moving-averaging unit 1114 from the output value of the moving-averaging unit 1104, and outputs a C-value.

A conversion table 1122 has a conversion table of the first gain FFg and the second gain FBg corresponded to the C-value, and outputs the first gain FFg and the second gain FBg based on the C-value output by the adder 1121. Positive value of the C-value means that the forward interference wave A2 is larger than the backward interference wave A3, whereas negative value of the C-value means that the backward interference wave A3 is larger than the forward interference wave A2. In other words, if the C-value is a positive value, the confidence of the first error signal ff_e of the forward equalizer 21 is judged as being low, since the forward interference wave A2 is larger than the backward interference wave A3, so that the first gain FFg will have a value smaller than "1.00", and the second gain FBg will have a value larger than "1.00". Conversely, if the C-value is a negative value, the confidence of the second error signal fb_e of the backward equalizer 23 is judged as being low, since the backward interference wave A3 is larger than the forward interference wave A2, so that the first gain FFg will have a value larger than "1.00", and the second gain FBg will have a value smaller than "1.00". If the C-value is −10 or larger and +10 or smaller, the first gain FFg and the second gain FBg will have the same value of "1.00". The reason why the multiplied value FFg×FBg of the first gain FFg and the second gain FBg is kept nearly at a constant level ("1.00", for example) for the same C-value is that the timing recovery loop may be stabilized by controlling the output value of the phase comparator unit 701 illustrated in FIG. 8 irrespective of the interference waves A2, A3.

Since the control circuit $01 operates in a real time manner while monitoring the tap coefficients am1, bm1 of the forward equalizer 21 and the tap coefficients ap1, bp1 of the backward equalizer 23, so that movement of the interference wave in the direction from a preceding position to a delay position (or in the opposite direction) relative to the main wave A1 induces correspondent changes in the first gain FFg and the second gain FBg.

FIG. 12 is a drawing illustrating an exemplary configuration of the control circuit 801 (FIG. 8) in another embodiment. The control circuit 801 illustrated in FIG. 12 has multipliers 1201, 1202, 1211, 1212, adders 1203, 1213, moving-averaging units 1204, 1214, and adders 1205, 1215, which are provided additionally to the control circuit 801 illustrated in FIG. 11. Aspects of the circuit illustrated in FIG. 12, different from those of the circuit illustrated in FIG. 11, will be explained in the next.

The multiplier 1201 outputs a squared value $am2^2$ of the second in-phase tap coefficient am2 of the forward equalizer 21. The multiplier 1202 outputs a squared value $bm2^2$ of the second quadrature tap coefficient bm2 of the forward equalizer 21. The adder 1203 adds the output values of the multipliers 1201 and 1202, and outputs $am2^2+bm2^2$. The moving-averaging unit 1204 performs moving-averaging (smoothing) of the output value of the adder 1203, and outputs the result. The adder 1205 adds the output values of the moving-averaging units 1104 and 1204, and outputs the result.

The multiplier 1211 outputs a squared value $ap2^2$ of the second in-phase tap coefficient ap2 of the backward equalizer 23. The multiplier 1212 outputs a squared value $bp2^2$ of the second quadrature tap coefficient bp2 of the backward equalizer 23. The adder 1213 adds the output values of the multipliers 1211 and 1212, and outputs $ap2^2+bp2^2$. The moving averaging unit 1214 performs moving-averaging (smoothing) of the adder 1213, and outputs the result. The adder 1215 adds the output values of the moving-averaging units 1114 and 1214, and outputs the result. The subtractor 1121 subtracts the output value of the adder 1215 from the output value of the adder 1205, and outputs a C-value. The conversion table 1122 outputs the first gain FFq and the second gain FBg, based on the C-value output by the subtractor 1121.

The circuit illustrated in FIG. 12 is different from the circuit illustrated in FIG. 11, in that it is configured to additionally receive the second in-phase tap coefficient am2 and the second quadrature tap coefficient bm2 of the forward equalizer 21, and the second in-phase tap coefficient ap2 and the second quadrature tap coefficient bp2 of the backward equalizer 23. The tap coefficients am2, bm2, ap2, bp2 are the tap coefficients second closest to the center tap (tap coefficient a0). The circuit illustrated in FIG. 12, configured to use a larger number of tap coefficient as compared with the circuit illustrated in FIG. 11, is capable of more precisely determining the strength of the forward interference wave A2 and the backward interference wave A3, and of setting the highly precise first gain FFg and the second gain FBg.

As described in the above, the control circuit 801 adjusts the first gain FFg smaller than the second gain FBg, when the forward interference wave A2 is larger than the backward interference wave A3, and adjusts the second gain FBg smaller than the first gain FFg when the backward interference wave A3 is larger than the forward interference wave A2.

The control circuit. 801 generates the first gain FFg and the second gain FBg, as illustrated in FIG. 5, based on the tap coefficients of the in-phase FIR filters 601, 604 of the forward equalizer 21, the quadrature FIR filters 602, 603 of the forward equalizer 21, the in-phase IIR filter calculating units 611, 614 of the backward equalizer 23, and the quadrature IIR filter calculating units 612, 613 of the backward equalizer 23.

The control circuit 801 adjusts the first gain FFg smaller than the second gain FBg, if the size of vectors which are given by the in-phase tap coefficient am1 and so forth of the in-phase FIR filters 601, 604 of the forward equalizer 21, and by the quadrature tap coefficient bm1 and so forth of the quadrature FIR filters 602, 603 of the forward equalizer 21, are larger than the size of vectors which are given by the in-phase tap coefficient ap1 and so forth of the in-phase IIR filter calculating units 611, 614 of the backward equalizer 23, and by the quadrature tap coefficients bp1 of the quadrature IIR filter calculating units 612, 613 of the backward equalizer 23.

In contrast, the control circuit 801 adjusts the second gain FBg smaller than the first gain FFg, if the size of vectors which are given by the in-phase tap coefficient ap1 and so forth of the in-phase IIR filter calculating units 611, 614 of the backward equalizer 23, and by the quadrature tap coefficient bp1 and so forth of the quadrature IIR filter calculating units 612, 613 of the backward equalizer 23, are larger than the size of vectors which are given by the in-phase tap coefficient am1 and so forth of the in-phase FIR filters 601, 604 of the backward equalizer 23, and by the quadrature tap coefficient had and so forth of the quadrature FIR filters 602, 603 of the forward equalizer 21.

The control circuit 801 illustrated in FIG. 11 compares the size of vector given by the first in-phase tap coefficient am1 and the first quadrature tap coefficient bm1, which are positioned, on the time scale, closest to the center tap (tap coefficient a0) of the in-phase FIR filters 601, 604 of the forward equalizer 21, with the size of vector given by the first in-phase tap coefficient ap1 and the first quadrature tap coefficient bp1 of the backward equalizer 23, and generates the first gain FFg and the second gain FBg.

The control circuit 801 illustrated in FIG. 12 generates the first gain FFg and the second gain FBg, based on the size of vector given by the first in-phase tap coefficient am1 and the first quadrature tap coefficient bm1 which are positioned, on the time scale, closest to the center tap (tap coefficient a0) of the in-phase FIR filters 601, 604 of the forward equalizer 21, the size of vector given by the first in-phase tap coefficient ap1 and the first quadrature tap coefficient bp1 of the backward equalizer 23, the size of vector given by the second in-phase tap coefficient am2 and the second quadrature tap coefficient bm2 which are positioned, on the time scale, second closest to the center tap (tap coefficient a0) of the in-phase FIR filters 601, 604 of the forward equalizer 21, and the size of vector given by the second in-phase tap coefficient ap2 and the second quadrature tap coefficient bp2 of the backward equalizer 23.

It was confirmed from the study using an FPGA (Field-Programmable Gate Array) that an effect of improving, by several dB, D/U value of the interference waves A2, A3 in the vicinity of the main wave A1 was obtained by the embodiment described in the above, since the tap coefficients a0 to a4 of the first FIR filter are calculated corresponding to the confidence of the first error signal ff_e of the forward equalizer 21 and the second error signal fb_e of the backward equalizer 23. The D/U value herein means a ratio of short-term average power D of the main wave A1 and short-term average power U of the interference waves A2, A3.

Accuracy in timing recovery may be prevented from degrading due to interference waves A2, A3, by generating the tap coefficients a0 to a4 of the interpolators (FIR filter) 14 and 18, using the tap coefficients of the FIR filters 601 to 604 of the forward equalizer 21 and the tap coefficients of the IIR filter calculating units 611 to 614 of the backward equalizer 23.

It is to be understood that all of the above-described embodiments are merely for exemplifying specific modes of implementation of the present invention, by which the technical scope of the present invention is not restrictively interpreted. The present invention may therefore be implemented in various ways without departing from the technical spirit or essential features thereof.

According to the present embodiments, accuracy of timing recovery may be prevented from degrading due to interference wave, by generating the tap coefficient of the first finite impulse response filter, using the tap coefficient of the second finite impulse response filter and the tap coefficient of the first infinite impulse response filter.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A symbol timing recovery circuit comprising:
an interpolator to generate at least one of an interpolation data of zero-crossing point and data identification point of an input digital signal, using a first finite impulse response filter;
a forward equalizer to eliminate a forward interference wave from the input digital signal based on the interpolation data generated by the interpolator, using a second finite impulse response filter, and to output a first resultant signal obtained after the elimination, a first identification signal, and a first error signal;
a backward equalizer to eliminate a backward interference wave of the input digital signal based on the interpolation data generated by the interpolator, using a first infinite impulse response filter, and to output a second resultant signal obtained after the elimination, a second identification signal, and a second error signal;
a first tap coefficient calculating unit to calculate a tap coefficient of the second finite impulse response filter, based on the interpolation data generated by the interpolator, the first resultant signal and the second resultant signal;
a second tap coefficient calculating unit to calculate a tap coefficient of the first infinite impulse response filter, based on the interpolation data generated by the interpolator, the first resultant signal and the second resultant signal; and
a timing recovery unit to generate a tap coefficient of the first finite impulse response filter, based on the tap coefficient of the second finite impulse response filter, the tap coefficient of the first infinite impulse response filter, the first identification signal, the first error signal, the second identification signal and the second error signal.

2. The symbol timing recovery circuit according to claim 1, wherein the first identification signal is a signal before being eliminated with the forward interference wave,
the first error signal is a differential signal between a signal before being eliminated with the forward interference wave and a signal after eliminated with the forward interference wave,
the second identification signal is a signal before being eliminated with the backward interference wave, and
the second error signal is a differential signal between a signal before being eliminated with the backward interference wave, and a signal after eliminated with the backward interference wave.

3. The symbol timing recovery circuit according to claim 1, wherein the timing recovery unit comprises:
a first phase comparator unit to mark the first error signal with a plus/minus sign, corresponding to time-dependent transient of the first identification signal;
a second phase comparator unit to mark the second error signal with a plus/minus sign, corresponding to time-dependent transient of the second identification signal;
a control circuit to generate a first gain and a second gain, based on a tap coefficient of the second finite impulse response filter and a tap coefficient of the first infinite impulse response filter;
a first multiplier to multiply the first error signal marked with the plus/minus sign by the first gain;
a second multiplier to multiply the second error signal marked with the plus/minus sign by the second gain; and
a third tap coefficient calculating unit to calculate a tap coefficient of the first finite impulse response filter, based on an output signal of the first multiplier and an output signal of the second multiplier.

4. The symbol timing recovery circuit according to claim 3, wherein the control circuit adjusts the first gain smaller than the second gain, when the forward interference wave is larger than the backward interference wave, and adjusts the second gain smaller than the first gain, when the backward interference wave is larger than the forward interference wave.

5. The symbol timing recovery circuit according to claim 4, wherein a multiplied value of the first gain and the second gain is a nearly constant value.

6. The symbol timing recovery circuit according to claim 3, wherein the second finite impulse response filter has a first in-phase finite impulse response filter and a first quadrature finite impulse response filter,
the first infinite impulse response filter has a first in-phase IIR filter calculating unit and a first quadrature IIR filter calculating unit, and
the control circuit generates the first gain and the second gain, based on the tap coefficients of the first in-phase finite impulse response filter, the first quadrature finite impulse response filter, the first in-phase IIR filter calculating unit and the first quadrature IIR filter calculating unit.

7. The symbol timing recovery circuit according to claim 6, wherein the control circuit adjusts the first gain smaller than the second gain, when size of vector given by an in-phase tap coefficient of the first in-phase finite impulse response filter and a quadrature tap coefficient of the first quadrature finite impulse response filter is larger than size of vector given by an in-phase tap coefficient of the first in-phase IIR filter calculating unit and a quadrature tap coefficient of the first quadrature IIR filter calculating unit, and
adjusts the second gain smaller than the first gain, when size of vector given by an in-phase tap coefficient of the first in-phase IIR filter calculating unit and a quadrature tap coefficient of the first quadrature IIR filter calculating unit is larger than size of vector given by an in-phase tap coefficient of the first in-phase finite impulse response filter and a quadrature tap coefficient of the first quadrature finite impulse response filter.

8. The symbol timing recovery circuit according to claim 7, wherein the control circuit generates the first gain and the second gain, by comparing size of vector given by a first in-phase tap coefficient and a first quadrature tap coefficient which are nearest to the center tap of the first in-phase finite impulse response filter, with size of vector given by the first in-phase tap coefficient and the first quadrature tap coefficient of the first in-phase IIR filter calculating unit.

9. The symbol timing recovery circuit according to claim 7, wherein the control circuit generates the first gain and the second gain, based on size of vector given by a first in-phase tap coefficient and a first quadrature tap coefficient which are nearest to the center tap of the first in-phase finite impulse response filter, size of vector given by a second in-phase tap coefficient and a second quadrature tap coefficient which are second nearest to the center tap of the first in-phase finite impulse response filter, size of vector given by a first in-phase tap coefficient and a first quadrature tap coefficient of the first in-phase IIR filter calculating unit, and size of vector given by a second in-phase tap coefficient and a second quadrature tap coefficient of the first in-phase IIR filter calculating unit.

* * * * *